United States Patent
Suh

(10) Patent No.: US 7,373,452 B2
(45) Date of Patent: May 13, 2008

(54) CONTROLLER FOR CONTROLLING NONVOLATILE MEMORY

(75) Inventor: Woon-Sik Suh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 95 days.

(21) Appl. No.: 11/034,176

(22) Filed: Jan. 12, 2005

(65) Prior Publication Data
US 2005/0182893 A1    Aug. 18, 2005

(30) Foreign Application Priority Data
Feb. 16, 2004    (KR)    ...................... 10-2004-0010144

(51) Int. Cl.
*G06F 12/00*    (2006.01)
*G06F 13/00*    (2006.01)

(52) U.S. Cl. ........................ 711/103; 711/100; 711/165

(58) Field of Classification Search ........... 365/185.11; 711/100, 103, 104, 154, 165
See application file for complete search history.

(56) References Cited

U.S. PATENT DOCUMENTS

| 5,596,713 | A * | 1/1997 | DeRoo et al. ................. 714/35 |
| 5,696,929 | A * | 12/1997 | Hasbun et al. ............... 711/103 |
| 6,275,436 | B1 * | 8/2001 | Tobita et al. ................ 365/221 |
| 6,519,185 | B2 * | 2/2003 | Harari et al. .......... 365/185.33 |
| 2002/0185337 | A1 * | 12/2002 | Miura et al. .................. 185/11 |
| 2005/0166004 | A1 * | 7/2005 | Campanale et al. ........ 711/103 |
| 2006/0064539 | A1 * | 3/2006 | Mukaida et al. ............ 711/103 |
| 2006/0143365 | A1 * | 6/2006 | Kikuchi ...................... 711/103 |
| 2006/0205120 | A1 * | 9/2006 | Harari ........................ 438/128 |

FOREIGN PATENT DOCUMENTS

| JP | 2002-278781 | 9/2002 |
| JP | 2002-366429 | 12/2002 |
| KR | 10-2003-0021631 | 3/2003 |

OTHER PUBLICATIONS

Micheloni, Rino; Campardo, Giovanni. "The Flash Memory Read Path: Building Blocks and Critical Aspects". Proceedings of the IEEE, vol. 91, No. 4, Apr. 2003, p. 537-553.*
Park, Chanik et al. ("A Low-cost Memory Architecture with NAND XIP for Mobile Embedded Systems". International Conference on Hardware/Software Codesign and Synthesis. Oct. 2003. pp. 138-143).*

* cited by examiner

Primary Examiner—Tuan V. Thai
(74) Attorney, Agent, or Firm—F.Chau & Associates, LLC

(57) ABSTRACT

A memory controller is provided which is connected to a nonvolatile memory (e.g., a NAND flash memory) and a volatile memory (e.g., a DRAM or SDRAM), where the memory controller controls an access to the nonvolatile memory and the volatile memory in response to a memory request, and includes a memory for storing address information of data stored in the volatile memory, and where the memory controller determines whether address information inputted at the memory request is identical to address information of the memory, and selectively accesses the nonvolatile memory according to the determined result.

34 Claims, 5 Drawing Sheets

CONTROLLER FOR CONTROLLING NONVOLATILE MEMORY

CROSS-REFERENCE TO RELATED APPLICATIONS

This U.S. non-provisional patent application claims foreign priority under 35 U.S.C. § 119 to Korean Patent Application 2004-10144, filed on Feb. 16, 2004, the entire contents of which are hereby incorporated by reference.

BACKGROUND OF THE INVENTION

The present disclosure relates to information processing systems, and more specifically, to memory systems including a nonvolatile memory.

As mobile systems and various applications have been developed, flash memories (a type of nonvolatile memory) and memory systems controlling the flash memories are increasingly desired. Although a flash memory is capable of storing a large amount of data information, it has the drawback that the time required for reading and writing the data is somewhat long.

This disadvantage of the flash memory can be solved by a buffer memory. For example, data from a host is stored not in the flash memory directly, but in a buffer memory first. Then, the data stored in the buffer memory is read and the read data is stored in the flash memory. Similarly, the data read from the flash memory is not transmitted to the host directly but to the buffer memory first. Then, the data stored in the buffer memory is read and the read data is transmitted to the host. This transmission method may improve performances of the memory system and the information process system (e.g., mobile application) including the same.

This memory system, however, has the following problems. At booting, the data stored in the flash memory must be copied into the buffer memory, such that the memory is used ineffectively. In addition, an additional mode (e.g., a demand paging mode) should be applied to copy the data of the flash memory into the buffer memory. This causes a software burden to the system and degrades the entire performance of the system including the memory system.

SUMMARY OF THE INVENTION

An aspect of the present disclosure is to provide memory systems capable of controlling a flash memory without involved software.

Another aspect of the present disclosure is to provide memory systems capable of managing the flash memory in units of pages.

An embodiment of the present disclosure is directed to a memory system comprising: a NAND flash memory; a RAM for storing data of the NAND flash memory; and a controller for controlling an access to the RAM and the NAND flash memory in response to a memory request. The controller includes a memory for storing address information of the data stored in the RAM, and controls the NAND flash memory to be accessed selectively at the memory request with reference to the memory address information. Specifically, the controller embodiment determines whether the address information inputted at the memory request is identical to the memory address information, and selectively accesses the NAND flash memory according to the determined result. For instance, when the address information inputted at the memory request is identical to the memory address information, the controller outputs the data of the RAM to the outside without any access to the NAND flash memory. When the address information inputted at the memory request is not identical to the memory address information The controller controls the NAND flash memory to output the data of the NAND flash data memory to the RAM and the outside.

In one exemplary embodiment, the controller manages the NAND flash memory in units of pages instead of blocks and stores the page address information of the NAND flash memory in the memory. In addition, whenever the externally inputted data is stored in the RAM, the controller stores the address information of the stored data in the memory.

In one exemplary embodiment, the controller further includes: a main control unit for issuing a read/write access command according to whether the address information inputted at the memory request is identical to the address information of the memory; a memory control unit for controlling an access operation of the RAM in response to the read/write access command from the main control unit when the address information inputted at the memory request is identical to the memory address information; and a flash memory management and control unit for controlling an access operation of the NAND flash memory in response to the read/write access command from the main control unit when the address information inputted at the memory request is not identical to the memory address information.

In one exemplary embodiment, when the address information inputted at the memory request is identical to the memory address information, the main control unit converts the address to a RAM address suitable for the RAM, and outputs the converted RAM address to the RAM.

In one exemplary embodiment, when the address information inputted at the memory request is not identical to the memory address information, the flash memory management and control unit converts the address to a NAND address suitable for the NAND flash memory.

In one exemplary embodiment, the flash memory management and control unit stores the information related on an accessed page of the NAND flash memory in the memory. The flash memory management and control unit stores defective page information in the memory when the accessed page of the NAND flash memory is the defective page. The flash memory management and control unit includes a page address table that is set to select another page instead of the defective page when the NAND flash memory is accessed.

In one exemplary embodiment, when the new data is written in the RAM, the main control unit stores in the memory valid address information for indicating whether new data is stored in the RAM. When an updated operation is requested, the flash memory management and control unit generates a NAND address with reference to the valid address information of the memory.

In one exemplary embodiment, the controller further includes a temporary memory that temporarily stores data read from the NAND flash memory. When the data of the RAM is stored in the NAND flash memory, the temporary memory stores data from the RAM by a control of the memory control unit, the stored data being outputted to the NAND flash memory by the control of the flash memory management and control unit. In addition, when the data of the NAND flash memory is stored in the RAM, the temporary memory stores the data from the NAND flash memory by the control of the flash memory management and control unit, the stored data being outputted to the RAM and the outside by the control of the memory control unit.

The present disclosure is directed to a memory system embodiment comprising: a NAND flash memory; a RAM for storing data of the NAND flash memory; and a controller for controlling an access to the RAM and the NAND flash memory. The controller comprises a memory for storing a tag address from memory address information of the data stored in the RAM; a main control unit for issuing either one of first and second access commands according to whether a tag address from a memory address inputted at a memory request is identical to a tag address of the memory; a memory control unit for controlling an access operation to the RAM in response to the first access command; and a flash memory management and control unit for controlling an access to the NAND flash memory in response to the second access command.

In one exemplary embodiment, when the tag address from the memory addresses inputted at the memory request is identical to the tag address of the memory, the controller controls the memory control unit to output the data of the RAM to the outside without an access to the NAND flash memory.

In one exemplary embodiment, when the tag address from the memory addresses inputted at the memory request is not identical to the tag address of the memory, the controller controls the flash memory management and control unit and the memory control unit to output the data of the NAND flash memory to the RAM and the outside.

In one exemplary embodiment, the flash memory management and control unit manages the NAND flash memory in units of not blocks but pages, and stores the page address information of the NAND flash memory in the memory.

In one exemplary embodiment, whenever an externally inputted data is stored in the RAM, the main control unit stores the tag address of the stored data in the memory.

In one exemplary embodiment, when the tag address from the memory addresses inputted at the memory request is identical to the tag address of the memory, the main control unit converts the memory address to the RAM address suitable for the RAM, and outputs the converted RAM address to the RAM.

In one exemplary embodiment, when the tag address from the memory addresses inputted at the memory request is not identical to the tag address of the memory, the flash memory management and control unit converts the memory address to the NAND address suitable for the NAND flash memory.

In one exemplary embodiment, the flash memory management and control unit stores information related on an accessed page of the NAND flash memory in the memory.

In one exemplary embodiment, the flash memory management and control unit stores defective page information in the memory when the accessed page of the NAND flash memory is a defective page. In addition, the flash memory management and control unit includes a page address table that is set to select another page instead of the defective page when the NAND flash memory is accessed. When the new data is written in the RAM, the main control unit stores valid address information for indicating whether new data is stored in the RAM. The flash memory management and control unit generates a NAND address with reference to the valid address information of the memory, when an update operation is requested.

The controller further comprises a temporary memory that stores the data read from the NAND flash memory temporarily. The temporary memory stores the data from the RAM by the control of the memory control unit, and the stored data is outputted to the NAND flash memory according to the flash memory management and control unit when the data from the RAM is stored in the NAND flash memory. In addition, when the data of the NAND flash memory is stored in the RAM, the temporary memory stores data read from the NAND flash memory by the control of the flash memory management and control unit, the stored data being outputted to the RAM and the outside by a control of the memory control unit.

BRIEF DESCRIPTION OF THE DRAWINGS

The accompanying drawings are included to provide a further understanding of the disclosure, and are incorporated in and constitute a part of this specification. The drawings illustrate exemplary embodiments of the present disclosure and, together with the description, serve to explain principles of the present disclosure. In the drawings.

DETAILED DESCRIPTION OF PREFERRED EMBODIMENTS

Figure 1:
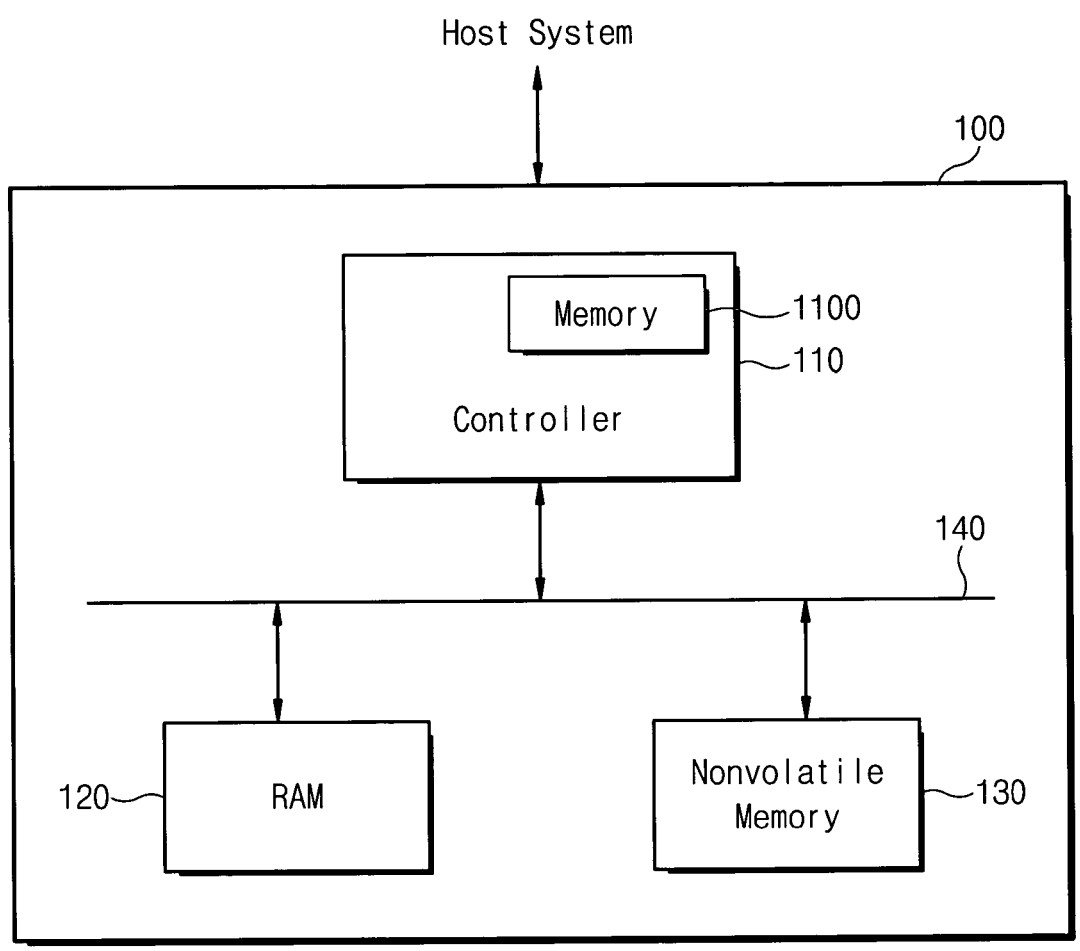
FIG. 1 is a schematic block diagram of a memory system according to the present disclosure.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will convey the scope of the invention to those skilled in the art. Like reference numerals and/or characters may refer to like elements throughout the specification.

Hereinafter, an exemplary embodiment of the present disclosure will be described in conjunction with the accompanying drawings.

FIG. 1 is a schematic block diagram of memory system according to the present disclosure. In FIG. 1, a memory system of the present disclosure 100 may be one of a single chip, multi-chip module, etc. For example, the memory system 100 of the present disclosure may be used as a memory card that can be inserted in a card slot formed in electronic devices (e.g., host systems) such as personal computers, mobile electronic devices (e.g., mobile phones and digital cameras) or game machines. However, it is well known to those skilled in the art that the use of the memory system 100 according to the present disclosure is not limited to those electronic devices. As illustrated in FIG. 1, the memory system 100 of the present disclosure includes a controller 110, a RAM 120, a nonvolatile memory 130 and a bus 140.

The controller 110 controls the RAM 120 and the nonvolatile memory 130. The controller 110 includes a memory 1100 for storing tag address information of data stored in the RAM 120. The memory 1100 may be practiced with an S-RAM, a content addressable memory (CAM) or the same kinds of devices, for example. The nonvolatile memory 130 includes a NAND flash memory. The controller 110 analyzes commands from the host system and controls RAM 120 and/or the nonvolatile memory 130 according to the stored address information and analyzed command. This will be fully explained. The host system is, for example, a personal computer and includes a card slot where the memory system 100 in FIG. 1 is inserted. The RAM 120 is used in storing data referred by the host system at least once. The address information of the referred data is stored in the memory 1100 in the controller 110 as described above.

According to the memory system 100 of the present disclosure, the nonvolatile memory 130 is not accessed whenever the memory is requested. In other words, the data of the nonvolatile memory 130 is accessed if only necessary. For example, when the data requested by the host system is stored in the RAM 120, the data stored in the RAM 120 is transmitted to the host system without an access to the nonvolatile memory. If the data requested by the host system is not stored in the RAM 120, the data outputted from the nonvolatile memory 130 is transmitted to the host system and stored in the RAM 120 at the same time. The fully described operations may be performed according to the address information stored in the memory 1100. Therefore, the nonvolatile memory 130 may be accessed with an additional mode and device driver.

Figure 2:
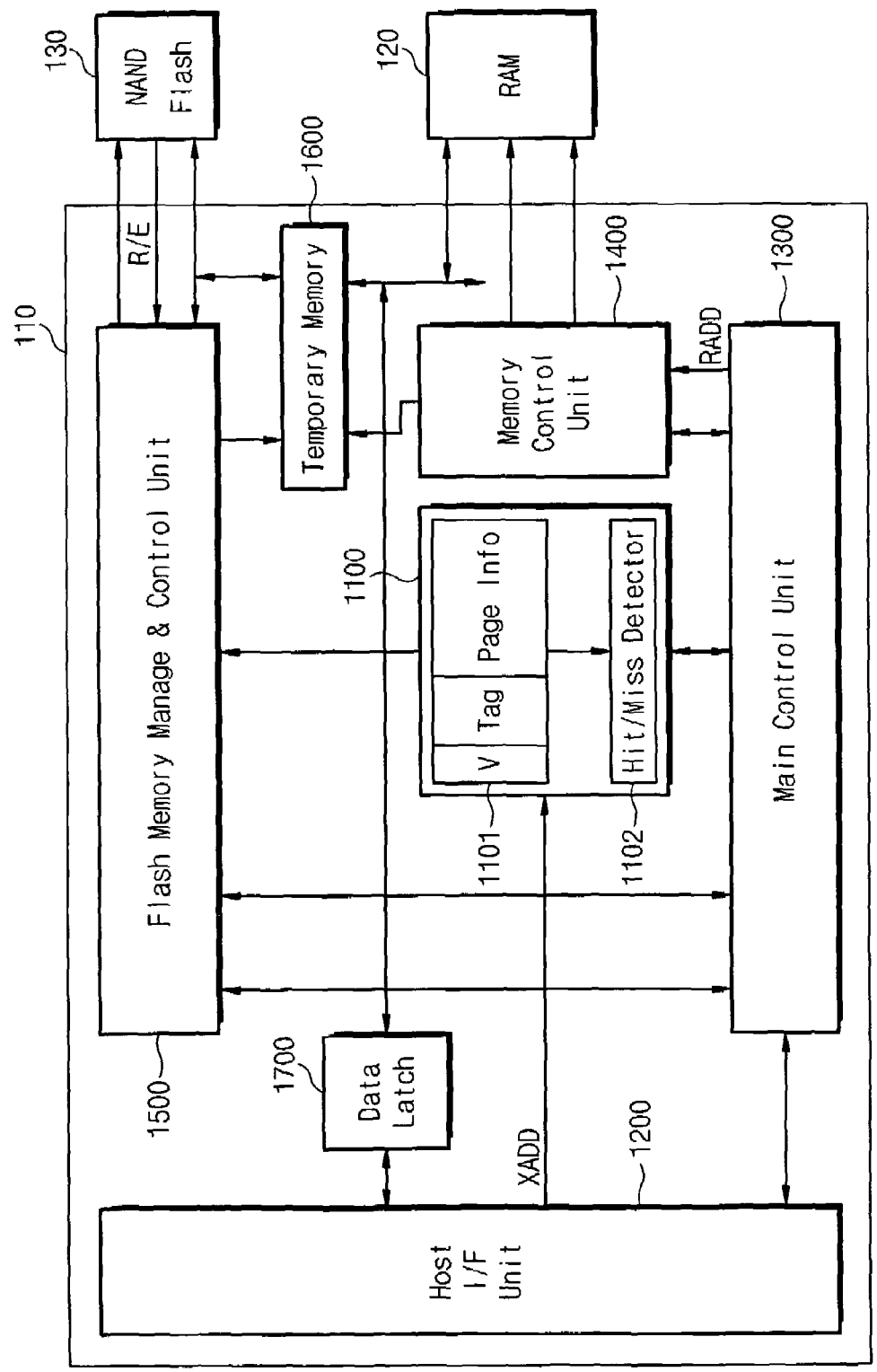
FIG. 2 is a schematic block diagram of a controller in FIG. 1 in accordance with the present disclosure.

FIG. 2 is a schematic block diagram of a controller usable in FIG. 1 according to an exemplary embodiment of the present disclosure. Here in FIG. 2, the RAM 120 is a DRAM and the nonvolatile memory 130 is a NAND flash memory. Referring to FIG. 2, the controller 110 of the present disclosure includes a memory 1100, a host interface unit 1200, a main control unit 1300, a memory control unit 1400, a flash memory management and control unit 1500, a temporary memory 1600, and a data latch 1700.

The memory 1100 stores address information of data stored in the RAM 120 (e.g., tag address information). In addition, the memory 1100 stores page address information of the NAND flash memory (e.g., defective page information). The memory 1100 includes a storage region 1101 for storing the tag address information and the page address information, and a hit/miss detector 1102. Valid bit information is stored in the storage region 1101. The valid bit information indicates whether new data is stored in a predetermined region of the RAM 120 that is to be assigned by a memory address XADD transmitted from the host system through the host interface unit 1200. The hit/miss detector 1102 detects whether a tag address from the memory addresses is identical to a tag address stored in the storage region 1101, and outputs the detected result to the main control unit 1300. The tag address information and the valid bit information may be stored in the storage region 1101 according to a control of the main control unit 1300.

The main control unit 1300 determines whether the memory request transmitted from the host system through the host interface unit 1200 indicates a read/write/write-back operation. The main control unit 1300 controls a memory 1100, a memory control unit 1400 and a flash memory management and control unit 1500 according to the determined result and the hit/miss detection result from the memory 1100. The main control unit 1300 converts the memory address XADD transmitted from the host system through the host interface unit 1200 to a RAM address RADD suitable for the RAM 120. The converted RAM address is provided to the memory control unit 1400.

The control unit 1400 controls a read/write operation of the RAM 120 when a RAM address RADD and a read command are inputted from the main control unit 1300. For instance, when the read command is inputted, the memory control unit 1400 outputs the control signals and the address to the RAM 120. A read operation is applied to the RAM 120 in the well-known manner, and the data read by the read operation is stored in the data latch 1700 temporarily. The data stored in the data latch 1700 may be outputted to the host system through the host interface unit 1200 according to a control of the main control unit 1300. When the write command is inputted, the memory control unit 1400 outputs the control signals and the address to the RAM. The data to be written in the RAM 120 is sent to the RAM 120 from the data latch 1700. As well known to those skilled in the art, the data to be stored in the RAM 120 may be transmitted to the data latch 1700 in the host system. Alternately, when the write command is inputted, the memory control unit 1400 outputs the control signals and the address to the RAM 1200, and the data to be written in the RAM 120 may be provided for the RAM 120 from a temporary memory 1600 according to a control of the memory control unit 1400. In this case, the data of the temporary memory 1600 is written from the NAND flash memory 130.

The flash memory management and control unit 1500 controls an access operation of the NAND flash memory 130 according to access information when the flash access information is inputted from the main control unit. For example, the flash read information is inputted from the main control unit 1300, the flash memory management and control unit 1500 converts the memory address from the host system to a NAND address and outputs a read command and the converted NAND address to the NAND flash memory 130 according to a predetermined timing. A predetermined time elapses (or the time required for sensing data from a selected page elapses), and the data outputted from the NAND flash memory 130 is stored in the temporary memory 1600 according to a control of the flash memory management and control unit 1500. The data stored in the temporary memory 1600 may be stored in the RAM 1200 according to a control of the memory control unit. The flash memory management and control unit 1500 determines whether the data outputted from the NAND flash memory 130 has an error. If the read data has an error, the flash memory management and control unit 1500 stores page information of the data having the error (this is referred to as "defective page information") in the memory 1100. The flash memory management and control unit 1500 remaps the page address according to the detective page information. As a result, the defective page may be replaced by another page (e.g., the next page of the defective page). Afterwards, the replaced page may be appointed instead of the defective page for an access request to the defective page.

Figure 3:
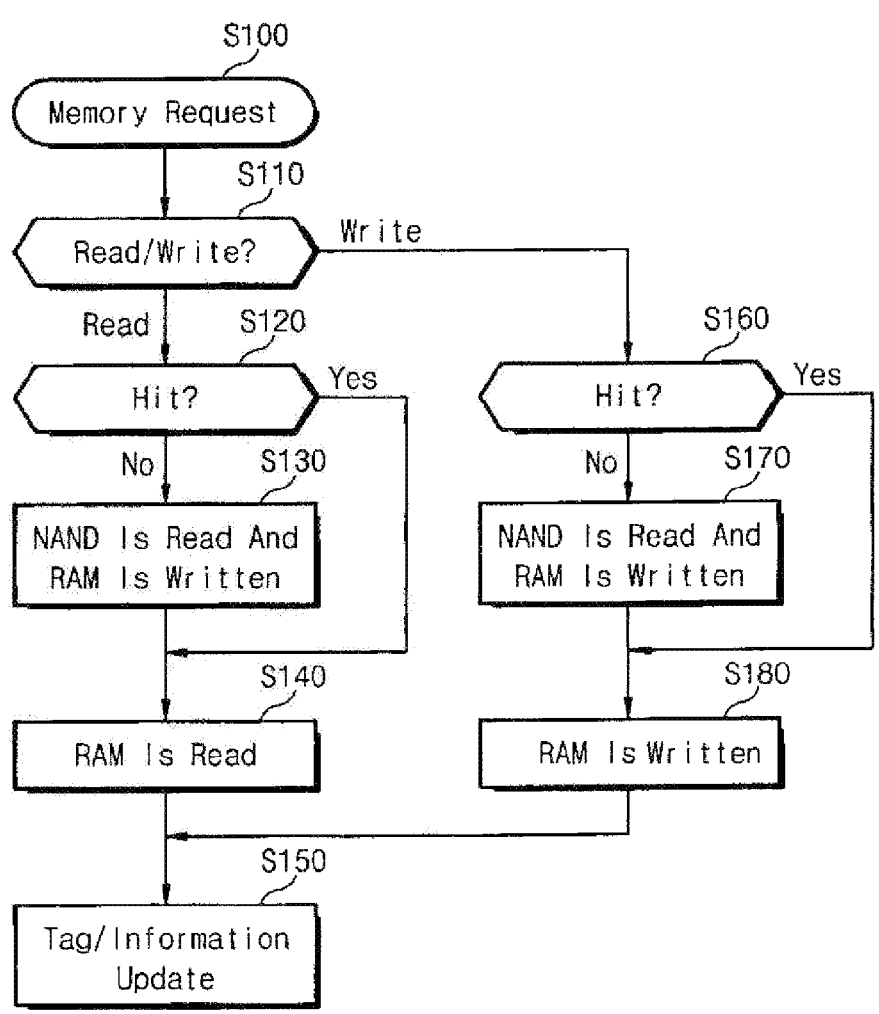
FIG. 3 is a flowchart useful in explaining reading and writing operations of a memory system in FIG. 2 in accordance with an exemplary embodiment of the present disclosure.

Referring to FIG. 3, if a memory request is inputted from the host system (step S100), the main control unit 1300 determines whether the memory request is a write operation or a read operation (step S110). If a read operation is requested, the process proceeds to a step S120. In the step S120, it is determined whether a portion of memory address transmitted from the host system is identical to the tag address in a storage region of the memory 1100. If identical, the process proceeds to a step S140. In the step S140, the data stored in the RAM 120 is sent to the host system. More specifically, the main control unit 1300 converts the memory address to the RAM address, and outputs a read command and the RAM address to the memory control unit 1400. The memory control unit 1400 sends the inputted read command and the RAM address to the RAM 120. Therefore, the RAM 120 carries out the read operation according to the inputted read command and the address. The data read from the RAM 120 may be transmitted to the host system through the data latch 1700 and the interface unit 1200.

When miss (as opposed to hit) information is inputted to the main control unit 1300 in the step S120, the process proceeds to a step S130. In the step S130, the data is read from the NAND flash memory according to a control of flash memory management and control unit 1500, and the read data may be stored in the RAM 120. More specifically, the flash memory management and control unit 1500 converts the memory address to a NAND address and outputs the converted address and the read command to the NAND flash memory 130 according to a preset timing. In this case, the flash memory management and control unit 1500 converts the memory address to the NAND address with reference to a page address table (or page information stored in the memory 1100). A predetermined time elapses, and the data outputted from the NAND flash memory 130 is stored in the temporary memory 160 by a control of the flash memory management and control unit 1500. The data stored in the temporary memory 1600 may be stored in the RAM 120 by a control of the memory control unit 1400. Simultaneously, the data read from the NAND flash memory 130 is outputted to the host system through the data latch 1700 and the host interface unit 1200. Then, the process proceeds to the step 140.

Returning to the process returns to the step S110, if the memory request is determined to be a write operation, the process proceeds to a step S160. It is determined whether a portion of the memory address transmitted from the host system is identical to the tag address in the storage region of the memory 1100 in the step S160. If identical, the process proceeds to a step 180. The data transmitted from the host system may be stored in the RAM 120 in the step S180. More specifically, the main control unit 1300 converts the memory address to a RAM address and outputs a write command and the RAM address to the memory control unit 1400. The memory control unit 1400 transmits the inputted write command and the RAM address to the RAM 120. Simultaneously, the data transmitted from the host system is sent to the RAM 120 through the host interface unit 1200 and the data latch 1700. According to the inputted write command and the address, the data may be stored in the RAM 120. Then, the process proceeds to a step 150.

If the miss information is inputted to the main control unit 1300 in the step S160, the process proceeds to the step S170. In the step S170, the data is read from the NAND flash memory according a control of the flash memory management and control unit 1500, and the read data is stored in the RAM 120. More specifically, the flash memory management and control unit 1500 converts the memory address to the NAND address, and outputs the converted address and the read command to the NAND flash memory 130 according to a preset timing. A predetermined time elapses, and the data outputted from the NAND flash memory 130 is stored in the temporary memory by a control of the flash memory management and control unit 1500. The data stored in the temporary memory 1600 may be stored in the RAM 120 according to a control of the flash memory management and control unit 1500. Next, the data transmitted from the host system is sent to the RAM 120 through the host interface unit 1200 and the data latch 1700, and may be stored in the RAM 120 by a control of the memory control unit 1400 in the step S180.

After the above operations are completed, an operation for updating a memory 1100 is performed in the step S150. Tag address information and valid bit information for indicating that new data is stored in a predetermined region of the RAM 120. The information corresponding to the tag address is stored in storage region 1101 of the memory 1100. Alternately, the page address information of the page address table may be stored in the memory 1100.

According to the above description, the NAND flash memory 130 is not accessed whenever the memory request is inputted from the host system but when there exists data requested by the RAM 120. This means that an additional mode (e.g., a demand paging mode) is not required for reading the data stored in the NAND flash memory 130. That is, the host system may be relieved from a software burden. In addition, effective management of memory is enabled because the data of the NAND flash memory 130 need not be stored in the entire RAM.

When the data is newly written into the RAM 120, the NAND flash memory 130 should be updated with the new data stored in the RAM 120.

Figure 4:
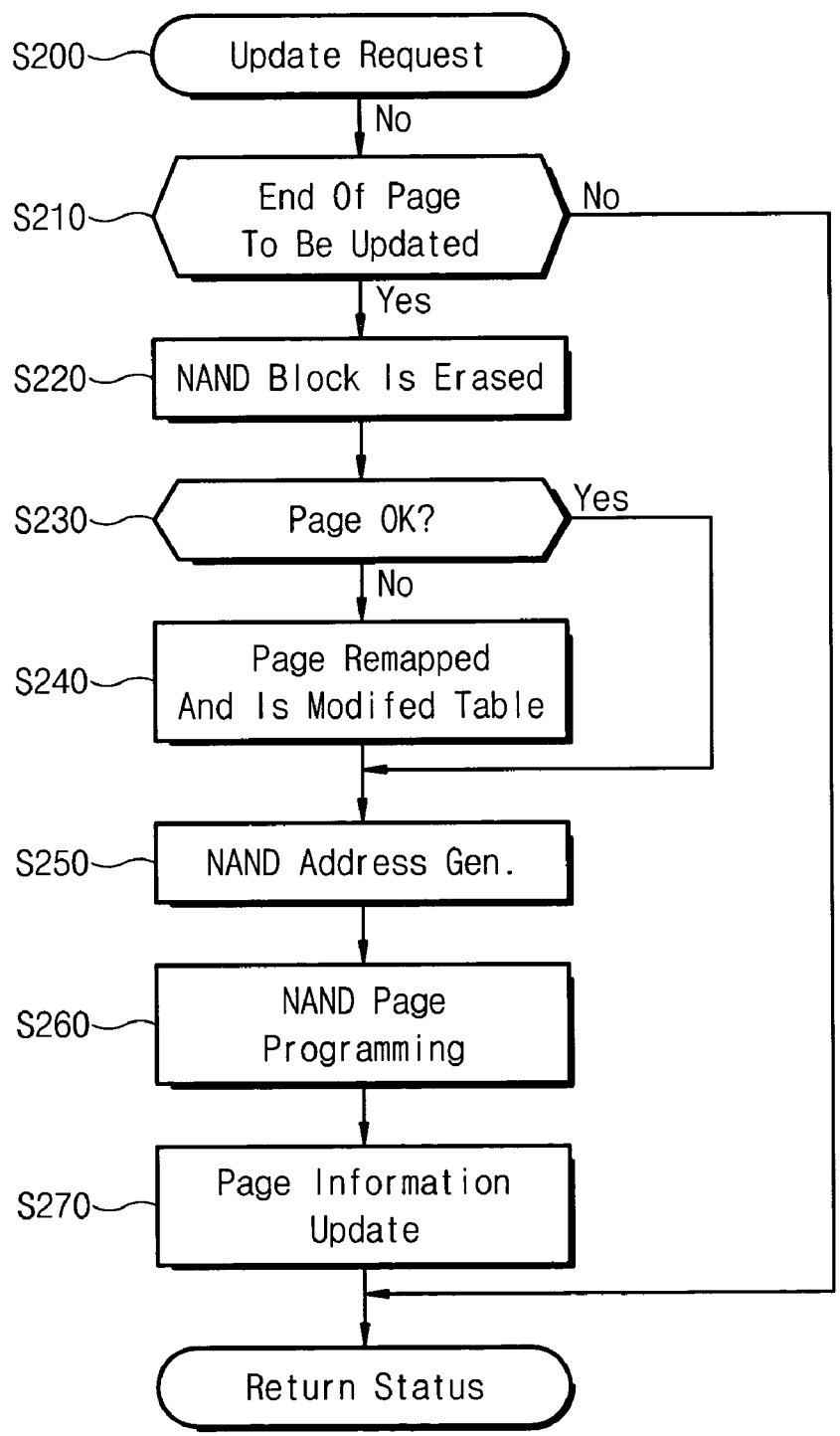
FIG. 4 is a flowchart useful in explaining an update operation of a memory system in accordance with the present disclosure.

FIG. 4 is a flowchart for explaining updating operations of the memory system in accordance with the present disclosure. The update operation of the memory system will be explained in further detail with reference to the drawing. The update operation is performed whenever the host system requests it. In addition, the update operation may be performed by a control of the main control unit 1300 while a system bus is not used. An update operation will be explained for exemplary purposes, which is the exemplary request by the host system. As described above, valid bit information is stored in the memory 1100. The valid bit information indicates whether the new data is stored in a predetermined region of the RAM 120 (e.g., a region where the page data of the NAND flash memory is stored). The update operation is carried out on the basis of the valid bit information stored in the memory 1100.

Figure 5:
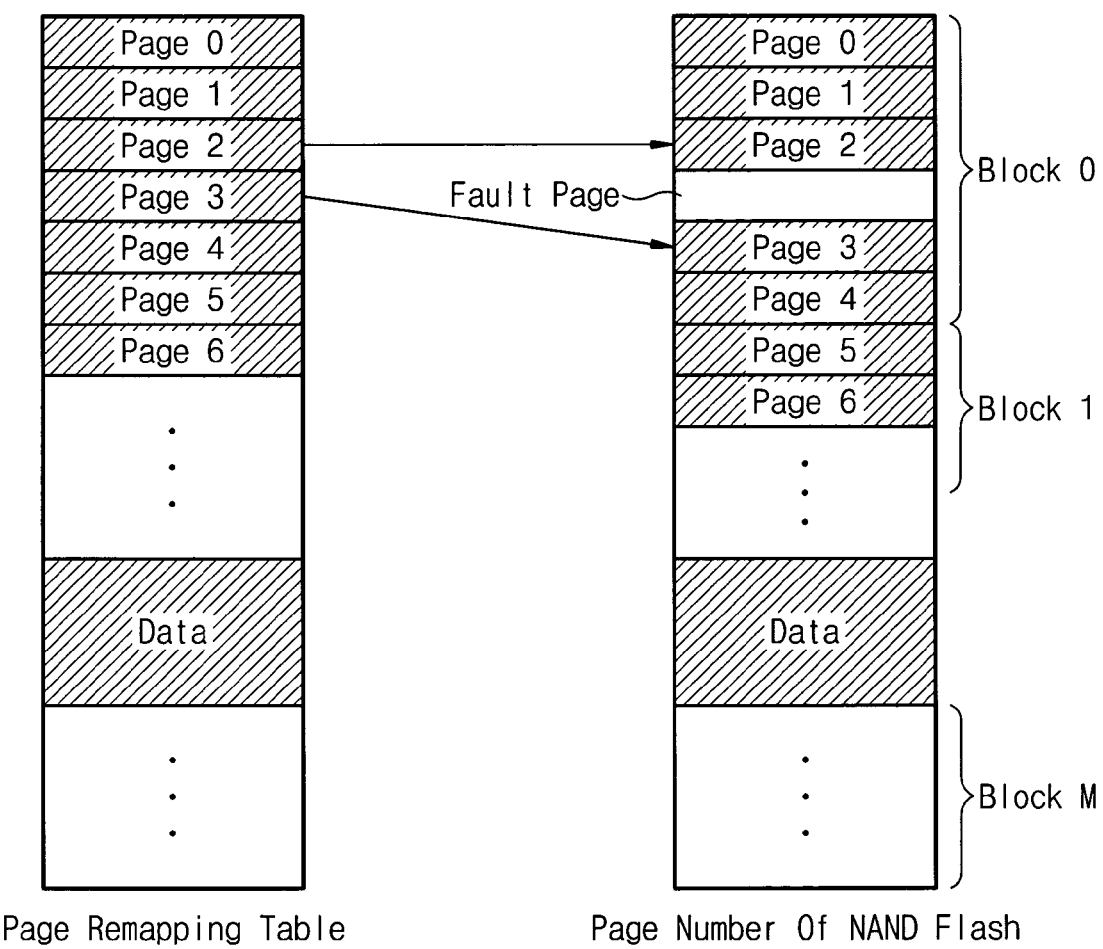
FIG. 5 is a diagram illustrating a relationship between a page address table of a flash memory management and control unit and page numbers of a NAND flash memory.

When an update request is inputted first (step S200), the main control unit 1300 issues an update command to the flash memory management and control unit 1500. The flash memory management and control unit 1500 determines whether a page of the NAND flash memory 130 to be selected is a page to be updated, sequentially referring to the page information stored in the memory 1100 and the valid bit information (step S210). If the page to be selected is the page to be updated, a memory block of the NAND flash memory 130 including the page to be selected is erased (step S220). After the erasing of the memory block, the erased memory block is checked to determine if it is a defective page (step S230). If it is a defective page, the flash memory management and control unit 1500 remaps the page address and then modifies the page address table as illustrated in FIG. 5 (step S240). The process then proceeds to a step S250. If there is no defective page at the step S230, the process proceeds to the step S250. The flash memory management and control unit 1500 generates a NAND address with the valid bit information of the memory in the step S250. The flash memory management and control unit 1500 outputs the NAND address, a program command and a series of data to the NAND flash memory 130. The data sent to the NAND flash memory 130 may be stored in the well-known manner of programming (step S260). The data sent to the NAND flash memory 130 is a page data and transmitted from the RAM 120 in the same manner as the above. The flash memory management and control unit 1500 stores the page address information stored in the page address table in the memory 1100 (step S270). Afterwards, the above update operation may be repeated until all of the valid bit information is referred.

As explained above, the NAND flash memory is not accessed whenever the memory request is introduced from the host system but when there exists data requested by the RAM. Therefore, the demand paging mode is not required, which is for reading data stored in the NAND flash memory. That is, the host system may be relieved from a software burden. In addition, effective memory management is enabled since the data of the NAND flash memory need not be stored in the entire RAM.

Although the present invention has been described in connection with the embodiment(s) of the present invention illustrated in the accompanying drawings, it is not limited thereto. It will be apparent to those skilled in the art that various substitutions, modifications and changes may be thereto without departing from the scope and spirit of the invention.

What is claimed is:

1. A memory system comprising:
    a NAND flash memory;
    a temporary memory in direct signal communication with the NAND flash memory;
    a RAM in direct signal communication with the temporary memory for storing data of the NAND flash memory; and
    a controller in signal communication with the NAND flash memory for controlling access to the RAM and the NAND flash memory in response to a memory request without software overhead from a host,
    wherein the controller includes the temporary memory and a memory for storing address information of the data stored in the RAM, and controls the NAND flash memory to be selectively accessed at the memory request with reference to the address information of the memory.

2. The memory system of claim 1, wherein the controller determines whether address information inputted at the memory request is identical to the address information of the memory, and selectively accesses the NAND flash memory according to the determined result.

3. The memory system of claim 2, wherein when the address information inputted at the memory request is identical to the address information of the memory, the controller outputs the data of the RAM to the outside without any access to the NAND flash memory.

4. The memory system of claim 2, wherein when the address information inputted at the memory request is not identical to the memory address information, the controller controls the NAND flash memory to output the data of the NAND flash memory to the RAM and the outside.

5. The memory system of claim 2, the controller further comprising:
    a main control unit for issuing a read/write access command according to whether the address information inputted at the memory request is identical to the address information of the memory;
    a memory control unit in signal communication with the main control unit for controlling an access operation of the RAM in response to the read/write access command from the main control unit when the address information inputted at the memory request is identical to the memory address information; and
    a flash memory management and control unit in signal communication with the main control unit for controlling an access operation of the NAND flash memory in response to the read/write access command from the main control unit when the address information inputted at the memory request is not identical to the memory address information.

6. The memory system of claim 5, wherein when the address information inputted at the memory request is identical to the memory address information, the main control unit converts the address to a RAM address suitable for the RAM, and outputs the converted RAM address to the RAM.

7. The memory system of claim 5, wherein when the address information inputted at the memory request is not identical to the memory address information, the flash memory management and control unit converts the address to a NAND address suitable for the NAND flash memory.

8. The memory system of claim 5, wherein the flash memory management and control unit stores related information on an accessed page of the NAND flash memory in the memory.

9. The memory system 8, wherein the flash memory management and control unit stores defective page information in the memory when the accessed page of the NAND flash memory is a defective page.

10. The memory system of claim 9, wherein the flash memory management and control unit includes a page address table that is set to select another page instead of the defective page when the NAND flash memory is accessed.

11. The memory system of claim 5, wherein when the new data is written in the RAM, the main control unit stores in the memory valid address information for indicating whether new data is stored in the RAM.

12. The memory system of claim 11, wherein when an update operation is requested, the flash memory management and control unit generates a NAND address with reference to the valid address information of the memory.

13. The memory system of claim 5, wherein when the data of the RAM is stored in the NAND flash memory, the temporary memory stores data from the RAM by the control of the memory control unit, the stored data being outputted to the NAND flash memory by the control of the flash memory management and control unit.

14. The memory system of claim 5, wherein when the data of the NAND flash memory is stored in the RAM, the temporary memory stores data from the NAND flash memory by the control of the flash memory management and control unit, the stored data being outputted to the RAM and the outside by the control of the memory control unit.

15. The memory system of claim 1, wherein the controller manages the NAND flash memory in units of pages instead of blocks and stores page address information of the NAND flash memory in the memory.

16. The memory system of claim 1, wherein whenever externally-inputted data is stored in the RAM, the controller stores address information of the stored data in the memory.

17. The memory system of claim 1, wherein the controller includes the temporary memory, which temporarily stores data read from the NAND flash memory.

18. The memory system of claim 1 wherein the temporary memory provides the only data path between the NAND flash memory and the RAM, the RAM is external to the controller, and the NAND flash memory is external to the controller.

19. A memory system comprising:
    a NAND flash memory;
    a temporary memory in direct signal communication with the NAND flash memory;
    a RAM in direct signal communication with the temporary memory for storing data of the NAND flash memory; and a controller in signal communication with the NAND flash memory and the RAM for controlling access to the RAM and the NAND flash memory without software overhead from a host, wherein the controller comprises:

the temporary memory;

a memory for storing a tag address from memory address information of data stored in the RAM;

a main control unit in signal communication with the memory for issuing either one of first and second access commands according to whether a tag address from a memory address inputted at a memory request is identical to a tag address of the memory;

a memory control unit in signal communication with the main control unit for controlling an access to the RAM in response to the first access command; and a flash memory management and control unit in signal communication with the main control unit for controlling an access to the NAND flash memory in response to the second access command.

20. The memory system of claim 19, wherein when the tag address from the memory address inputted at the memory request is identical to the tag address of the memory, the controller controls the memory control unit to output data of the RAM to the outside without an access to the NAND flash memory.

21. The memory system of claim 19, wherein when the tag address from the memory addresses inputted at the memory request is not identical to the tag address of the memory, the controller controls the flash memory management and control unit and the memory control unit to output data of the NAND flash memory to the RAM and to the outside.

22. The memory system of claim 19, wherein the flash memory management and control unit manages the NAND flash memory in units of not blocks but pages, and stores the page address information of the NAND flash memory in the memory.

23. The memory system of claim 19, wherein the main control unit stores a tag address of the stored data in the memory whenever an externally inputted data is stored in the RAM.

24. The memory system of claim 19, wherein when the tag address from the memory addresses inputted at the memory request is identical to the tag address of the memory, the main control unit converts the memory address to the RAM address suitable for the RAM, and outputs the converted RAM address to the RAM.

25. The memory system of claim 24, wherein when the tag address from the memory addresses inputted at the memory request is not identical to the tag address of the memory, the flash memory management and control unit converts the memory address to the NAND address suitable for the NAND flash memory.

26. The memory system of claim 19, wherein the flash memory management and control unit stores information related on an accessed page of the NAND flash memory in the memory.

27. The memory system of claim 26, wherein the flash memory management and control unit stores defective page information in the memory when the accessed page of the NAND flash memory is a defective page.

28. The memory system of claim 26, wherein the flash memory management and control unit includes a page address table that is set to select another page instead of the defective page when the NAND flash memory is accessed.

29. The memory system of claim 19, wherein when new data is written in the RAM, the main control unit stores valid address information for indicating whether the new data is stored in the RAM.

30. The memory system of claim 29, wherein when an update operation is requested, the flash memory management and control unit generates a NAND address with reference to the valid address information of the memory.

31. The memory system of claim 19, wherein the controller further comprises a temporary memory in signal communication with the memory control unit that temporarily stores data read from the NAND flash memory.

32. The memory system of claim 31, wherein when data from the RAM is stored in the NAND flash memory, the temporary memory stores data from the RAM by the control of the memory control unit, the stored data being outputted to the NAND flash memory according to the flash memory management and control unit.

33. The memory system of claim 31, wherein when data from the NAND flash memory is stored in the RAM, the temporary memory stores data from the NAND flash memory by the control of the flash memory management and control unit, the stored data being outputted to the RAM and to the outside by a control of the memory control unit.

34. The memory system of claim 19 wherein the temporary memory provides the only data path between the NAND flash memory and the RAM, the RAM is external to the controller, and the NAND flash memory is external to the controller.

* * * * *